United States Patent [19]

Zenobi et al.

[11] Patent Number: 4,470,565
[45] Date of Patent: Sep. 11, 1984

[54] YAW STABILIZATION FOR AIRCRAFT EJECTION SEATS

[75] Inventors: Thomas J. Zenobi, Perkasie; Peter Ayoub, Bryn Mawr, both of Pa.

[73] Assignee: The United States of America as represented by the Secretary of the Navy, Washington, D.C.

[21] Appl. No.: 499,716

[22] Filed: May 31, 1983

[51] Int. Cl.³ ............................................. B64D 25/10
[52] U.S. Cl. ................................. 244/122 A; 244/141
[58] Field of Search .......... 244/91, 49, 122 R, 122 A, 244/122 AE, 141, 87, 3.27–3.29, 130, 140

[56] References Cited

U.S. PATENT DOCUMENTS

| | | | |
|---|---|---|---|
| 2,931,598 | 4/1960 | Sanctuary | 244/122 A |
| 3,027,124 | 3/1962 | Statt | 244/122 A |
| 3,662,978 | 5/1972 | Hollrock . | |
| 3,679,157 | 7/1972 | Roberts | 244/122 A |
| 3,826,448 | 7/1974 | Burk | 244/91 |
| 4,017,041 | 4/1977 | Nelson | 244/91 |
| 4,017,043 | 4/1977 | Barzda . | |
| 4,261,535 | 4/1981 | Swanson . | |
| 4,303,212 | 12/1981 | Stone et al. . | |

FOREIGN PATENT DOCUMENTS 34737  11/1965  Finland ............................... 244/141

Primary Examiner—Galen Barefoot
Attorney, Agent, or Firm—Robert F. Beers; Henry Hansen; Vincent T. Pace

[57] ABSTRACT

An aircraft ejection seat is provided with deployable fins for stabilizing yaw rotation. The fins are normally stowed along the sides of the ejection seat. During ejection, the fins are deployed aft of the seat by means of rotational actuators. Anti-entanglement sheets are collapsibly disposed between the fins and the sides of the seat in order to prevent fouling of the parachute.

9 Claims, 3 Drawing Figures

YAW STABILIZATION FOR AIRCRAFT EJECTION SEATS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to aircraft ejection seats and, more particularly, to a means for stabilizing the yaw of an aircraft ejection seat after it has been ejected.

In the attempt to stabilize aircraft ejection seats, drogue parachutes are often utilized. The drogue chute, however, presents certain disadvantages. First, since it tends to align with the relative windstream, it inhibits stabilization of the seat in the pitch and roll axes. Second, current ejection seats are so unstable that they may begin to tumble and spin before the drogue chute is fully deployed. This results in the drogue chute or its lines being wrapped around the seat or becoming entangled on seat components, creating a situation which could seriously jeopardize the survival of the ejected airman.

Various means, other than drogue chutes have been devised to control the flight of ejection seats. For example, one type of ejection seat has a plurality of inflatable air bags in two vertical rows on the back of the seat. When these bags are inflated they provide stabilization by reducing the aerodynamic drag in the wake region of the seat. However, there may be a substantial time delay after ejection before the air bags are fully deployed. Therefore, significant tumbling and rotation could result before the air bags became effective. Furthermore, this ejection seat does not have any means to prevent entanglement of the main chute in the inflated air bags.

Another type of ejection seat has a pair of fin assemblies which include both horizontal and vertical fins. These fins provide air drag forces after ejection in order to keep the seat from rotating too far backward. They are fully deployed at the time of ejection and move only in response to the main windstream. However, the function of the fins is limited to aligning the seat for minimal drag. Furthermore, there is no means provided for preventing entanglement of the main chute in the fin assemblies.

There are also other types of ejection seats which have deployable rotors and tail fins. However, deployment and deceleration are still initiated by a drogue chute in these ejection seats. Thus the problems are discussed above which surround deployment of the drogue chute itself would still be present in these ejection seats. Furthermore, neither of these ejection seats has parachute anti-entanglement means since they apparently do not utilize parachutes to control descent.

SUMMARY OF THE INVENTION

Accordingly, it is an object of this invention to stabilize the yaw rotation of an aircraft ejection seat after emergency ejection.

It is another object of this invention to deploy the yaw stabilization means in an extremely short time after emergency ejection.

It is a further object of this invention to prevent entanglement of the main parachute in the yaw stabilization device.

The above and other objects are accomplished by the subject invention which includes yaw stabilizing fin assemblies, means for deploying these fin assemblies, and means for preventing the parachute from becoming entangled in the fin assemblies. The fin assemblies consist of a stabilizing fin which is attached to or integral with a connecting arm. The connecting arm, in turn, is attached to the ejection seat by means of rotational actuators. These rotational actuators serve to deploy the fin assemblies by rotating them from their stowed position adjacent the sides of the ejection seat to their deployed position approximately 90° aft of the seat.

In addition, sheets of collapsible fabric are attached to both the fin assemblies and the sides of the seat. When the fin assemblies are fully deployed these sheets are extendably disposed between the fin assemblies and the seat in order to prevent the parachute from becoming entangled. The sheets also provide additional surface area for yaw control. The fin assemblies each have a recess for stowing the respective anti-entanglement sheet when not deployed.

A better understanding of these and other aspects of the invention may be had by referring to the following detailed description in conjunction with the drawings wherein:

DESCRIPTION OF THE PREFERRED EMBODIMENT

Figure 1:
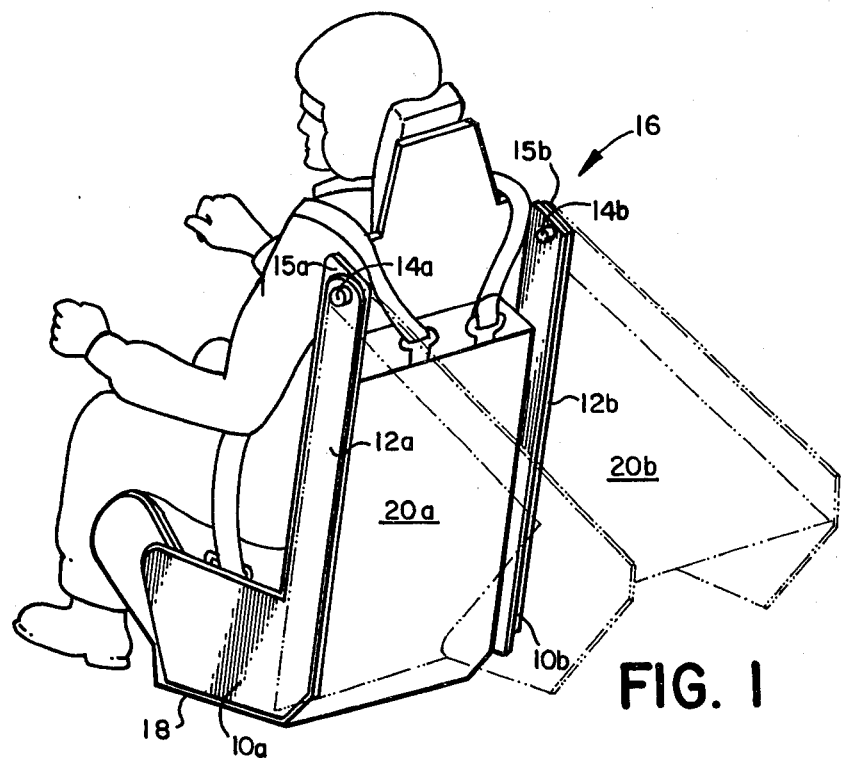
FIG. 1 shows an aircraft ejection seat incorporating the yaw stabilizing apparatus.

Referring now to FIG. 1 there is shown generally an aircraft ejection seat 16. The ejection seat 16 is equipped with yaw stabilization apparatus which consists of stabilizing fins 10a and 10b; connected arms 12a and 12b; rotational actuators 14a and 14b; and anti-entanglement sheets 20a and 20b.

In the embodiment shown in FIG. 1 the yaw stabilization apparatus is shown in the stowed position adjacent to the side panels 18 of the ejection seat. During ejection, as soon as the ejection seat 16 leaves the guide rails in the aircraft cockpit, the rotational actuators 14a, 14b become operative and cause the connecting arms 12a, 12b and fins 10a, 10b to rotate approximately 90° aft. The yaw stabilization apparatus can thus be deployed in an extremely short time in the ejection cycle, just before the seat departs the aircraft. After deployment the apparatus would appear as shown by the dashed outline.

The rotational actuators 14a, 14b may be some type of active rotational mechanism such as a torsion spring, ballistically actuated reel, or lanyard actuated reel. The rotational actuators 14a, 14b are affixed to the upper sides 15a, 15b of the ejection seat. They are also affixed to the ends of the connecting arms 12a, 12b.

The rotational actuators 14a, 14b also include some type of mechanical stop (not shown) in order to limit rotation to approximately 90° from the stowed position. This mechanical stop could also be external to the rotational actuators 14a, 14b. For example, it could be mounted on the connecting arms 12a, 12b.

Figure 2:
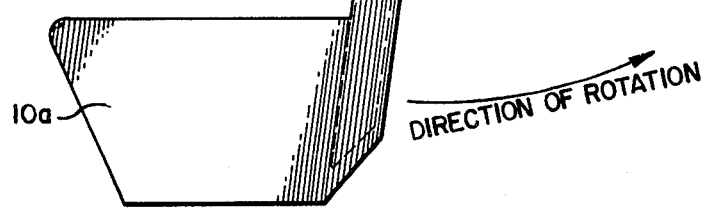
FIG. 2 shows a single stabilizing fin assembly.

The connecting arms 12a, 12b and the stabilizing fins 10a, 10b form assemblies one of which is shown generally as 24 in FIG. 2. The fin/arm assembly 24 is usually constructed of some strong yet lightweight material such as fiberglass, aluminum, or some type of composite material. The connecting arm 12a must be constructed so as to be able to withstand bending stresses due to momentary windblast loading normal to the surface of the stabilization fin 10a. Additionally, the connecting arm 12a is equipped with some means for attaching to the rotational actuator 14a. This may be realized by a single hole, plural bolt holes, or some type of flange or coupling.

Furthermore, although the embodiment illustrated in FIG. 2 shows the fin/arm assembly 24 as a one-piece unit, this is not necessary and the fin/arm assembly 24 may be constructed of two or more pieces. For example, the stabilization fin 10a may be mechanically attached to the connecting arm 12a by such methods as welding, bolting, etc.

Figure 3:
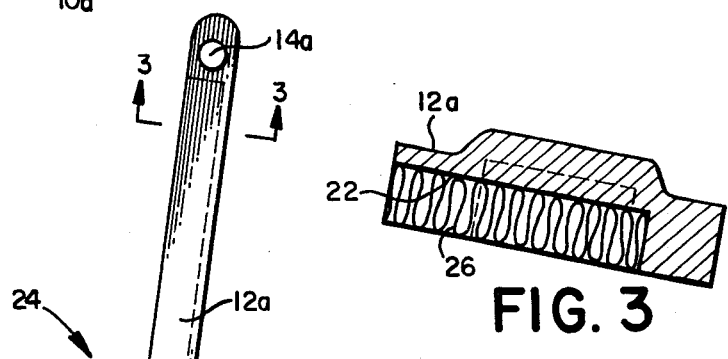
FIG. 3 shows a cross-section of the connecting arm as viewed along the section line 3—3 in FIG. 2.

As shown in FIG. 3, the connecting arm 12a has a recess 22 formed on one side. This recess 22 provides a stowage compartment for the anti-entanglement sheets 20a, 20b (FIG. 1). This recess 22 runs almost the entire length of the connecting arm 12a, as shown by the dash line in FIG. 2.

The anti-entanglement sheets 20a, 20b are made of some thin, fairly strong, collapsible fabric such as Mylar or canvas. In the preferred embodiment shown in FIG. 1 the anti-entanglement sheets 20a, 20b are triangular in shape. However, other geometries may also be utilized when circumstances so require.

The anti-entanglement sheets 20a, 20b are attached to the sides of the ejection seat 16 and to the connecting arms 12a, 12b. Thus, when the yaw stabilization apparatus is deployed after ejection initiation, the anti-entanglement sheets 20a, 20b will be deployed at the same time. The principal function of the anti-entanglement sheets 20a, 20b is to prevent the parachute canopy and shrouds from wrapping around or being caught up in the yaw stabilization apparatus. As can be readily appreciated, the anti-entanglement sheets 20a, 20b also act as additional yaw control surfaces.

Many modifications and variations of the subject invention are possible in light of the above teachings. It is therefore to be understood that within the scope of the appended claims the invention may be practiced otherwise than as specifically described.

What is claimed is:

1. An apparatus for providing yaw stability in a parachute equipped aircraft ejection seat comprising:
   a pair of rigid stabilizers vertically oriented and formed to be stowed at the sides of the ejection seat;
   actuator means operatively connected to said stabilizers and the ejection seat for automatically deploying said stabilizers aftwardly; and
   anti-entanglement sheets contiguously connected to the ejection seat and said stabilizers for preventing entanglement of the parachute with said stabilizers when the parachute is deployed.

2. A yaw stabilizing apparatus as recited in claim 1 wherein the actuator means comprises rotational actuators fixedly attached to the sides of the ejection seat and to the ends of said stabilizers whereby said stabilizers may be automatically rotated from their stowed position at the sides of the ejection seat to their deployed position.

3. A yaw stabilizing apparatus as recited in claim 2 wherein the stabilizers comprise:
   elongated arms each having means at one end for receiving a rotational actuator;
   stabilizing fin panels;
   means for affixing said stabilizing fin panels to said arms;
   means for stowing the parachute anti-entanglement sheets within said arms; and
   means for affixing said parachute anti-entanglement sheets along the length of said elongated arms.

4. A yaw stabilizing apparatus as recited in claim 3 wherein the elongated arms have longitudinal recesses for stowing their respective parachute anti-entanglement sheets.

5. A yaw stabilizing apparatus as recited in claim 4 wherein the parachute entanglement prevention sheets comprise:
   thin sheets of flexible fabric fixedly attached to the sides of the ejection seat and to the stabilizers such that when the stabilizers are not deployed the sheets are stowed in the recesses of the elongated arms, and when the stabilizers are deployed, the sheets are stretched almost flat.

6. A yaw stabilizing apparatus as recited in claim 5 wherein the rotational actuators include mechanical stops for limiting the rotation of the actuators to approximately 90° from the stowed position.

7. A yaw stabilized ejection system for an aircraft comprising: an ejection seat equipped for deploying a parachute after ejection from the aircraft;
   a pair of rigid stabilizers stowed on either side of said seat, each including a forwardly extending fin portion along the base of said seat and an upwardly extending arm portion along the back edge of said seat, said arm portion being pivotally connected at the distal end thereof to the upper end of said seat;
   actuator means operatively connected to said stabilizers and said seat for automatically deploying said stabilizers aftwardly from said seat when ejected; and
   anti-entanglement sheets contiguously connected to said seat and said stabilizers for preventing entanglement of the parachute when said stabilizers and the parachute are deployed.

8. A yaw stabilized ejection system as recited in claim 7 further comprising:
   means for limiting the rotation of the stabilizers to approximately 90° from the stowed position.

9. A yaw stabilized ejection system as recited in claim 7 wherein the stabilizers have longitudinal recesses along the arm portions for stowing the anti-entanglement sheets.

* * * * *